US008214511B2

(12) United States Patent
Jung et al.

(10) Patent No.: US 8,214,511 B2
(45) Date of Patent: Jul. 3, 2012

(54) RTSP-BASED PROGRESSIVE STREAMING METHOD

(75) Inventors: Soon-Heung Jung, Daejon (KR); Jae-Gon Kim, Daejon (KR); Jin-Woo Hong, Daejon (KR); Kwang-Deok Seo, Wonju-si (KR)

(73) Assignee: Electronics and Telecommunications Research Institute, Daejon (KR)

( * ) Notice: Subject to any disclaimer, the term of this patent is extended or adjusted under 35 U.S.C. 154(b) by 286 days.

(21) Appl. No.: 12/298,232

(22) PCT Filed: Dec. 12, 2006

(86) PCT No.: PCT/KR2006/005408
§ 371 (c)(1),
(2), (4) Date: Oct. 23, 2008

(87) PCT Pub. No.: WO2007/123299
PCT Pub. Date: Nov. 1, 2007

(65) Prior Publication Data
US 2009/0271525 A1    Oct. 29, 2009

(30) Foreign Application Priority Data
Apr. 24, 2006   (KR) .................. 10-2006-0036883

(51) Int. Cl.
*G06F 15/16* (2006.01)
(52) U.S. Cl. ........ 709/228; 709/223; 709/227; 709/229; 709/230; 709/231; 709/232; 709/238; 709/248
(58) Field of Classification Search .................. 709/223, 709/227–232, 238, 248
See application file for complete search history.

(56) References Cited

U.S. PATENT DOCUMENTS

| 5,928,331 | A  | * | 7/1999 | Bushmitch ........... 709/231 |
| 6,754,715 | B1 | * | 6/2004 | Cannon et al. ....... 709/231 |
| 6,857,130 | B2 | * | 2/2005 | Srikantan et al. ...... 725/93 |
| 6,910,078 | B1 | * | 6/2005 | Raman et al. ......... 709/231 |
| 7,023,924 | B1 | * | 4/2006 | Keller et al. ...... 375/240.26 |

(Continued)

FOREIGN PATENT DOCUMENTS

KR   10-2002--0000971     1/2002

(Continued)

OTHER PUBLICATIONS

Kikuchi et al., "RTP Payload Format for MPEG-4 Audio/Visual Streams," Request for Comments: 3016, Nov. 2000, pp. 1-21.*

(Continued)

*Primary Examiner* — Dohm Chankong
(74) *Attorney, Agent, or Firm* — Kile Park Goekjian Reed & McManus PLLC (57) ABSTRACT

Provided is a real-time streaming protocol (RTSP) based progressive streaming method. The progressive streaming method based on a real-time streaming protocol, wherein a server transfers SDP information and performs streaming of a contents file to a client connected, the method including the steps of: a) if a "pause" request message is received from the client, transmitting a "pause" response message including the number of TCP packets already transferred to the client, and pausing streaming of the contents file; and b) if a "replay" request message including the number of the TCP packet to be transferred is received from the client, transmitting a "replay" response message and restarting transmission of the TCP packets from the next TCP packet to the TCP packet transferred to the client before the contents file is paused.

20 Claims, 5 Drawing Sheets

U.S. PATENT DOCUMENTS

| | | | |
|---|---|---|---|
| 7,151,749 B2 * | 12/2006 | Vega-Garcia et al. | 370/241.1 |
| 7,272,651 B1 * | 9/2007 | Bolding et al. | 709/227 |
| 7,366,241 B2 * | 4/2008 | Matsui | 375/240.27 |
| 7,451,229 B2 * | 11/2008 | Klemets et al. | 709/236 |
| 7,683,940 B2 * | 3/2010 | Fleming | 348/222.1 |
| 2002/0004841 A1 * | 1/2002 | Sawatari | 709/232 |
| 2002/0010917 A1 | 1/2002 | Srikantan et al. | |
| 2002/0141740 A1 * | 10/2002 | Matsui | 386/111 |
| 2002/0194361 A1 * | 12/2002 | Itoh et al. | 709/233 |
| 2003/0002865 A1 * | 1/2003 | Matsui et al. | 386/125 |
| 2003/0061371 A1 * | 3/2003 | Deshpande | 709/232 |
| 2003/0131353 A1 * | 7/2003 | Blom et al. | 725/25 |
| 2003/0236907 A1 * | 12/2003 | Stewart et al. | 709/231 |
| 2003/0236912 A1 | 12/2003 | Klemets et al. | |
| 2005/0071886 A1 * | 3/2005 | Deshpande | 725/135 |
| 2005/0254526 A1 * | 11/2005 | Wang et al. | 370/503 |
| 2006/0089838 A1 * | 4/2006 | Gentric et al. | 705/1 |
| 2006/0259949 A1 * | 11/2006 | Schaefer et al. | 726/1 |
| 2006/0279628 A1 * | 12/2006 | Fleming | 348/143 |
| 2007/0101012 A1 * | 5/2007 | Li et al. | 709/231 |
| 2008/0215704 A1 * | 9/2008 | Curcio et al. | 709/217 |

FOREIGN PATENT DOCUMENTS

| | | |
|---|---|---|
| KR | 10-2005-0034834 | 4/2005 |
| KR | 10-2005-0042301 | 5/2005 |
| KR | 10-2006-0026010 | 3/2006 |
| KR | 10-2006-0078648 | 7/2006 |
| KR | 10-2007-0104797 | 10/2007 |

OTHER PUBLICATIONS

International Search Report, for PCT/KR2006/005408, Dated Mar. 19, 2007.
H. Schulzrinne, Real Time Streaming Protocol (RTSP), IETF RFC 2326, Dated Apr. 1998, pp. 1-91.
M. Handley, "SDP: Session Description Protocol", IETF RFC 2327, Dated Apr. 1998, pp. 1-42.
ISMA "Internet Streaming Media Alliance", Implementation Specification Ver. 2.0 Dec. 2004, See Ch. 5-8 (media format, media transport, media control, and media storage), Dated Dec. 2004, pp. 1-16.
Yong-Duck Yu et al., "Design of the WIPI Application Development Environment with Dynamic Upgrade Capability", 2003 Regular General Meeting and Proceedings of Fall Workshop of Korea Information and Communications Society, Dec. 22, 2003.

* cited by examiner

RTSP-BASED PROGRESSIVE STREAMING METHOD

FIELD OF THE INVENTION

The present invention relates to a real-time streaming protocol (RTSP) based progressive streaming method; and, more particularly, to a RTSP based progressive streaming method, when playing, pausing and replaying a contents file transmitted from a server in a client, the next frame to the frame played before the contents file being paused.

DESCRIPTION OF RELATED ART

There are two methods to transferring contents through a wired/wireless network; one is a download method and the other is a real-time streaming method.

First, a download method starts playing contents after downloading all contents files. Although the download method provides a high quality service, the download method takes long time to download the contents files and need more capacity to save the contents files, because the download method plays the contents file after downloading the all contents files.

The real-time streaming method downloads contents files and plays the contents files in real-time. Although the real-time streaming method needs minimum capacity to play, a quality of the real-time streaming method is dependent on the network's state, because the real-time streaming method does not download all contents files.

On the other hand, characteristics of a transferring method, i.e., the download method and the real-time streaming method are decided by a characteristic of a transport protocol adopted by the transferring method.

The download method transfers the contents file by adopting a transmission control protocol (TCP). If the packet is lost during data transmission, the TCP can retransmit the packet. Accordingly, the TCP transfers a reliable contents file. However, the TCP is difficult to be adapted to the real time application due to delay from retransmission of the contents file.

The real-time streaming method transfers the contents file by adopting a user datagram protocol (UDP). The UDP is suitable for transmitting data in real-time, because the UDP takes a connectionless datagram method and does not support the retransmission function. However, the UDP guarantees no reliability when delivering the contents file.

In order to guarantee the reliability, the UDP is used along with a real-time transport protocol (RTP). The RTP provides time information necessary for real time application and synchronization function of the information media. However, the UDP still has a disadvantage that the quality of the image during real-time streaming is disqualified because the UDP does not qualify the quality and the reliability.

The download method should reduce the waiting time to play the image and the real-time streaming method should play the high-quality image in stable.

The progressive streaming method is introduced in order to resolve the disadvantages of the download method and streaming method. The progressive streaming method does not apply the UDP, the RTP, a RTP control protocol, a real-time streaming protocol (RTSP). The progressive streaming method connects to a server based on uses a Hypertext Transfer protocol, and then uses the TCP as a transmission protocol.

The progressive streaming method is a method combining the download method and the streaming method. That is to say, the progressive streaming method may be a downloading method due to use of HTTP based TCP, and the progressive streaming method may be a streaming method due to playing of the contents file during the download of the contents file.

Since the progressive streaming method uses the TCP, the progressive streaming method offers more reliable quality than the real-time streaming method.

Also, the progressive streaming method does not use the complicated protocol, e.g., the real time transport protocol or RTP control protocol, and therefore, the progressive streaming method does not need streaming packet using packetization using hint track.

Hereinafter, with reference to FIG. 1, the HTTP based progressive streaming method will be described.

Figure 1:
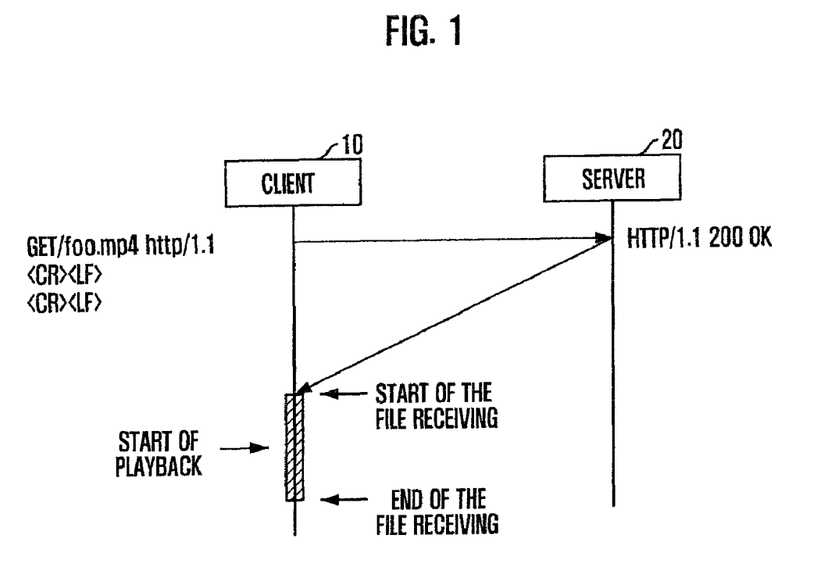
FIG. 1 is a diagram showing a progressive streaming protocol operation in accordance with a conventional hypertext transfer protocol (HTTP)

FIG. 1 is a diagram showing a progressive streaming protocol operation in accordance with a conventional hypertext transfer protocol (HTTP).

As shown, if a client 10 requests to transfer the contents "foo.mp4" by using a command "HTTP GET", a server 20 accepts this request and transfers the contents files based on the TCP. At this point, the client 10 does not wait the all contents files, if the contents files are stored on a self buffer, the client 10 operates a self regenerator and plays the contents files.

Since the conventional HTTP based progressive streaming protocol is operated based on the HTTP, the state transition between the client 10 and the server 20, that is to say, pause function, replay function, etc. can not be performed.

For example, in the conventional HTTP based progressive streaming protocol, the client can not request to offer the "pause" function to the server 20. That is to say, the client 10 can stop the play by using "stop" function, however, the client can not request the server to offer "replay" function to play the contents from the stop point. The client 10 has to receive the contents file again from beginning of the contents file.

In the HTTP based progressive streaming protocol, since it is difficult to interact between the client and the server, a user can not handle various commands, e.g., "pause" function and "replay" function.

SUMMARY OF THE INVENTION

It is, therefore, an object of the present invention to provide a RTSP based progressive streaming method, when playing, pausing and replaying a contents file transmitted from a server in a client, the next frame to the frame played before the contents file being paused based on a real-time transport protocol.

a RTSP based progressive streaming method, when playing, pausing and replaying a contents file transmitted from a server in a client, the next frame to the frame played before the contents file being paused based on a real-time transport protocol.

In accordance with one aspect of the present invention, there is provided a progressive streaming method based on a real-time streaming protocol, wherein a server transfers SDP information and performs streaming of a contents file to a client connected, the method comprising the steps of: a) if a "pause" request message is received from the client, transmitting a "pause" response message including the number of TCP packets already transferred to the client, and pausing streaming of the contents file; and b) if a "replay" request message including the number of the TCP packet to be transferred is received from the client, transmitting a "replay" response message and restarting transmission of the TCP packets from the next TCP packet to the TCP packet transferred to the client before the contents file is paused.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings. In addition, if it is considered that detailed description on the prior art may obscure the points of the present invention, the detailed description will not be provided herein. The preferred embodiments of the present invention will be described in detail hereinafter with reference to the attached drawings.

Hereinafter, for easy description, it is assumed that the client 10 and server 20 operate based on the progressive streaming method described above with reference to FIG. 1.

Figure 2:
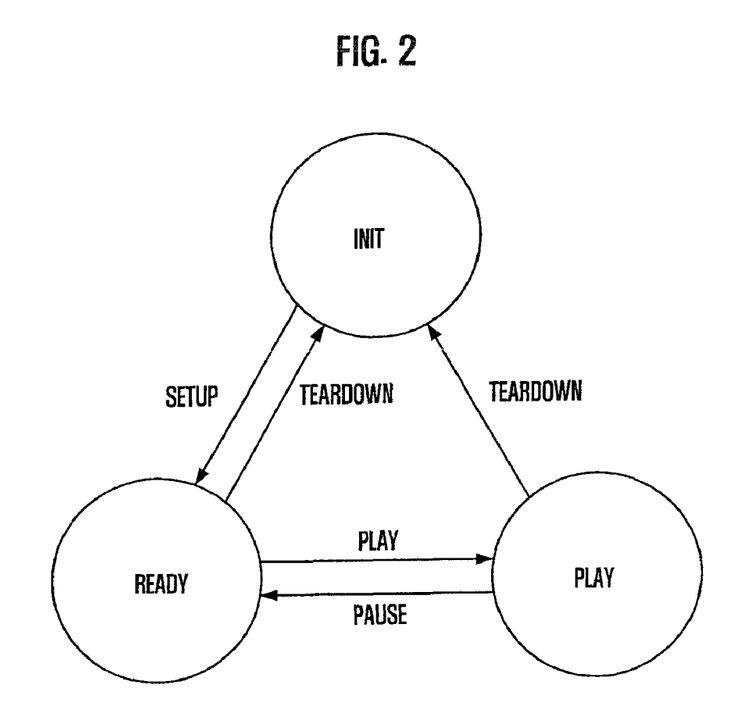
FIG. 2 is a state transition diagram describing state transitions of a client based on a real-time streaming protocol (RTSP) to which the present invention is applied.

FIG. 2 is a state transition diagram describing state transitions of a client based on a real-time streaming protocol (RTSP) to which the present invention is applied.

As above-mentioned, the client 10 transits the state among an initialization state INIT, a ready state READY and a play state PLAY.

At the initialization state, the client 10 sets up a player of the client 10, e.g., a video on Demand player, a media player, etc., and initializes a decoder of the client 10. At the ready state, the client 10 prepares TCP session connection to the server 20 in order to receive the contents stream. At the play state, the client 10 receives the contents stream continuously from server 20.

On the other hand, if the client 10 requests the server 20 to transit the state, the client 10 transits the state after receiving an acknowledgement of the request from the server 20.

In other words, if the client 10 requests the server 20 to setup at the initialization state, the client 10 transits the state to the ready state after receiving an acknowledgement of the request from the server 20.

Also, if the client 10 at ready state requests the server to teardown, the client 10 transits to the initialization state after receiving an acknowledgement of the request from the server 20. If the client 10 requests the server 20 to play, the client 10 transits the state to the play state after receiving an acknowledgement of the request from the server 20.

Also, if the client 10 requests the pause to server 20 at the play state, the client 10 transits the state to the ready state. If the client 10 requests the teardown to the server 20 at the play state, the client 10 transits the state to the initialization state after receiving an acknowledgement of the request from the server 20.

Figure 3:
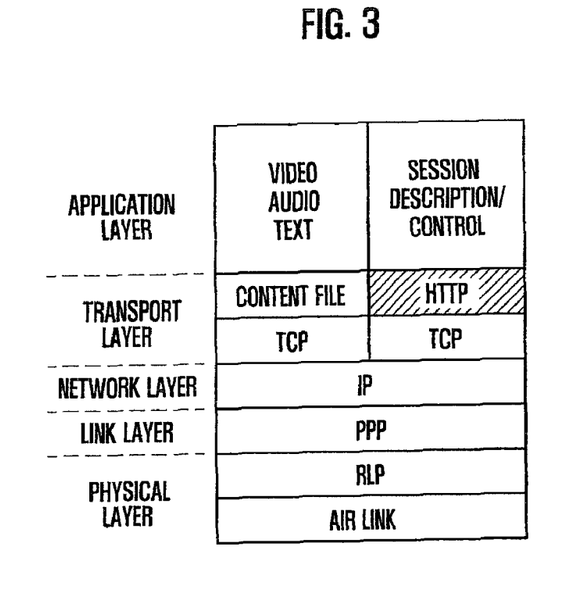
FIG. 3 is a diagram showing a progressive streaming protocol's stack in accordance with the conventional hypertext transfer protocol (HTTP)
Figure 4:
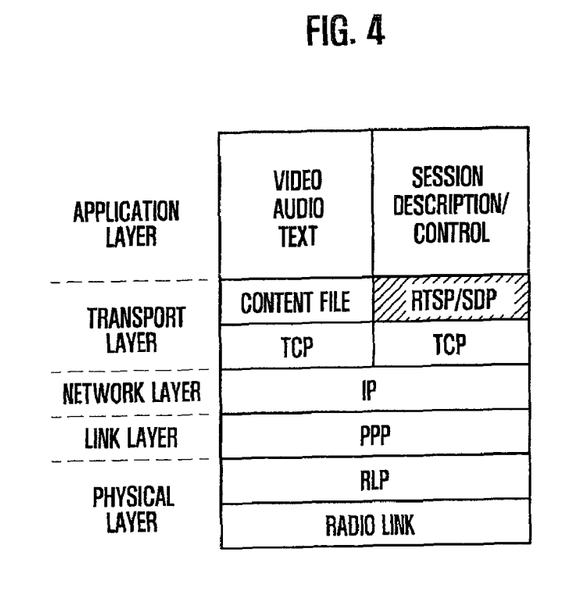
FIG. 4 is a diagram showing a progressive streaming protocol's stack in accordance with a real-time streaming protocol (RISP) to which the present invention is applied.

FIG. 3 is a diagram showing a progressive streaming protocol's stack in accordance with the conventional hypertext transfer protocol (HTTP); and FIG. 4 is a diagram showing a progressive streaming protocol's stack in accordance with a real-time streaming protocol (RISP) to which the present invention is applied.

As shown in FIG. 3, in the progressive streaming protocol's stack in accordance with the conventional hypertext transfer protocol (HTTP), the client 10 is connected to the server 20 through the HTTP in the transport layer.

As shown in FIG. 4, in progressive streaming protocol's stack in accordance with a real-time streaming protocol (RISP), the client 10 is connected to the server 20 through the RTSP/SDP in the transport layer.

Since an application layer, a network layer, a link layer and a physical layer are well known to the ordinary one skilled in the art, the detailed descriptions on them, for easy description, are skipped in this specification.

Figure 5:
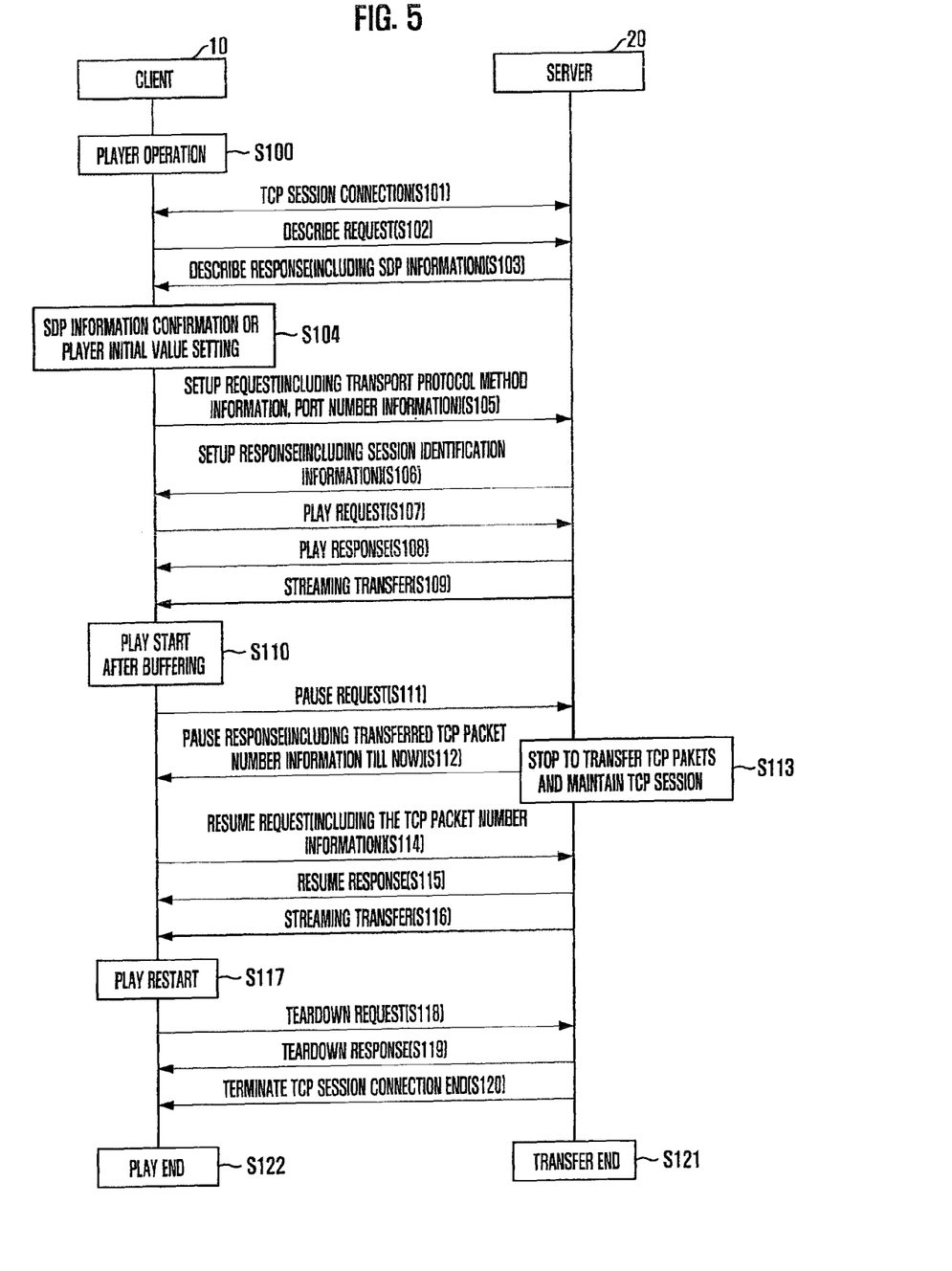
FIG. 5 is a flowchart illustrating a real-time streaming protocol (RTSP) based progressive streaming method.

FIG. 5 is a flowchart illustrating a real-time streaming protocol (RTSP) based progressive streaming method.

As shown, in the RTSP based progressive streaming method in accordance with an aspect of the present invention, basic instructions of the RTSP, e.g., "DESCRIBE", "SETUP", "PLAY", "PAUSE", "RESUME" and "TEARDOWN" are used.

Before describing the RTSP based progressive streaming method, explanation on the basic instructions of the RTSP will be described.

"DESCRIBE" is an instruction used in order that the client 10 requests the description on the contents file to the server 20 based on the RTSP URL.

The client 10 makes and transmits a "DESCRIBE" request message as described in Table 1 to the server 20.

TABLE 1

DESCRIBE
rtsp://streaming.june.com:554/81100/00001/81100_00001.skm RTSP/1.0
CSeq: 1
Accept: application/sdp
X-RPS-Start-Request: 0-
Accept-Language: en-KR "rtsp://streaming.june.com:554/81100/00001/81100_00001.skm" denotes the RTSP URL. "RTSP/1.0" denotes the RTSP version. The RTSP version prevents from collision among programs each of which version is different from another.

"Accept" is a header field and informs the server 20 of a description protocol which supports the client 10. "Accept: application/sdp" informs the server 20 that the client 10 is supported by the session description protocol (SDP).

Particularly, "X-RPS-Start-Request" means that the client 10 requires the progressive streaming service from a certain position of the contents file to the server 20. "0-" is the information requesting the streaming transfer from beginning of the contents file.

Also, the "X-RPS-Start-Request" describes the size of the contents file received before disconnection and records the starting point of the contents file to be re-downloaded. For example, "X-RPS-Start-Request: 2048-" represents that 2048 bytes are received before the disconnection. If the disconnection occurs during the service, the client 10 writes the starting point of the contents file on the field "X-RPS-Start-Request" and requests the download to the server 20.

The server 20 creates and transmits a "DESCRIBE" response message to as described in Table 2 to client 10. The "DESCRIBE" response message includes the SDP information in order to describe information on the contents file.

More particularly, the SDP information includes configuration information, e.g., MPEG-4 video object layer (VOL) information, H.264 sequence parameter set (SPS) information and pictures parameter set (PPS) information, which is necessary for video decoder's operation.

TABLE 2

RTSP/1.0 200 OK
CSeq: 1
Server:OTT-NSS/1.0
Accept-Ranges: bytes
Content-length: 1799925
Content-Type: application/octet-stream
X-RPS-Start-Response: 0-
v=0
o=OTT-NSS 2890844526 2890842807 IN IP4 126.16.64.4
m=audio 0 TCP/AVP 96 (? 96: AAC)
a=control:trackID=1
a=fmtp:96 profile-level-id=1; bitrate=64000; cpresent=0
m=video 0 TCP/AVP 100 (?100: MPEG-4 video baseline)
a=control:trackID=2
a=fmtp:100 profile-level-id=1; bitrate=128000; config=a first information value;
m=video 0 RTP/AVP102 (? 102: H.264 video)
a=control:trackID=3
a=fmtp:102 profile-level-id=42800B; bitrate=128000; parameter- sets=a second information value;

"X-RPS-Start-Response" includes meta information corresponding to the replay position of the contents file in "X-RPS-Start-Request". In detail, "0-" means that the replay starts after 0 byte, i.e., the start of the contents file.

Particularly, "Config=" denotes the video object layer information, i.e., the first information value, "parameter sets=" denotes the sequence variable set information and image variable set information, i.e., the second information value. Based on the above information, the client 10 obtains the configuration information necessary to play the video and prepares operation of the video decoder based on the configuration information in advance.

"SETUP" allows the client 10 to inform transfer information, e.g., the transport protocol, a port number, etc. to the server 20.

The client 10 makes and transmits a "SETUP" request message as described in Table 3 to the server 20. The client 10 informs the transport protocol and the port number to the server 20 through the "SETUP" request message.

TABLE 3

SETUP rtsp://streaming.june.com/81100/00001.skm RTSP/1.0
Cseq:2
Transport: TCP; unicast; client_port=6970
X-RPS-Packet-Size: 1024

"Transport: TCP" means that the transport protocol is "TCP" used to transfer the contents file. "client_port=6970" means that the allocated port number for the TCP channel is "6970". Herein, while two ports, one is an audio port and the other is a video port, should be allocated for the RTP/UDP based real-time streaming, one TCP channel port is allocated in the present invention.

"X-RPS-Packet-Size: 1024" means that contents file's size which the client want to receive to TCP packet's payload is 1024 byte.

The server 20 makes and transmits a "SETUP" response message as described in Table 4 to the client 10. The server 20 informs the client 10 of the transport protocol and the port number.

TABLE 4

RTSP/1.0 200 OK
Cseq:2
Session: 2890844526
Transport: TCP; unicast; client_port=6970;
source=126.16.64.4; server_port=2000
X-RPS-Packet-Size: 1024

"Session: 2890844526" is RTSP session identification information and is used for "SETUP" request message.

"server_port=2000" means that "2000" is allocated as the port number of the server 20.

"X-RPS-Packet-Size: 1024" means that the size of the contents file loaded on TCP packets for charge is 1024 bytes.

"PLAY" is an instruction used by the client 10 in order to request the start of streaming the contents file to the server 20.

The client 10 makes and transmits "PLAY" request to the server 20 as described in Table 5. The client 10 requests to the server 20 the streaming transmission of the contents file corresponding to the RTSP URL through "PLAY".

TABLE 5

PLAY rtsp://streaming.june.com/81100/00001.skm RTSP/1.0
Cseq:3
Session: 2890844526

"rtsp://streaming.june.com/81100/000I.skm RTSP/1.0 shows the RTSP URL of the content file.

The server 20 makes and transmits "PLAY" response as described in Table 6 to the client 10.

TABLE 6

RTSP/1.0 200 OK
Cseq:3
Session: 2890844526

"PAUSE" is an instruction used in order that that the client 10 requests the server 20 to temporarily stop the streaming transmission of the contents file.

The client 10 makes and transmits a "PAUSE" request message as described in Table 7 to the server 20. The client 10 requests pause of playing the contents file to server 20.

TABLE 7

PAUSE rtsp://streaming.june.com/81100/00001.skm RTSP/1.0
Cseq:4
Session: 2890844526

The server 20 makes and delivers a "PAUSE" response message as described in Table 8 to the client 10.

TABLE 8

RTSP/1.0 200 OK
CSeq: 4
Session: 2890844526
X-RPS-Packet-Sent: 112

"X-RPS-Packet-Sent: 112" means that 112 TCP packets were transferred. "X-RPS-Packet-Sent" is the information allowing a starting point of replay to be calculated when the client 10 wants the replay.

"RESUME" is an instruction used in order that the client 10 requests the server to replay the streaming transmission of the contents file paused by the "PAUSE" instruction.

The client 10 makes and transmits a "RESUME" request message as described in Table 9 to the server 20. The client 10 requests the transmission of the contents file except the TCP packets already received, because the client 10 requests to the server 20 retransmissions of the contents file after pausing the contents file.

TABLE 9

PLAY rtsp://streaming.june.com/81100/00001.skm RTSP/1.0
Cseq:5
Session: 2890844526
X-RPS-Packet-Receive: 113-

"X-RPS-Packet-Receive: 113-" means that the number of the TCP packet wants to be transmitted after pausing is "113th TCP packet". That is to say, since the number of the TCP packets already transferred is "112", as described in "X-RPS-Packet-Sent" of Table 8, the number of the TCP packet wants to be transferred next is "113".

The server 20 makes and transmits a "RESUME" response message as described in Table 10 to the client 10.

TABLE 10

RTSP/1.0 206 Partial Content
Cseq:5
Session: 2890844526
Accept-Ranges: bytes
Content-Length: 1684212
Content-Range: bytes 115713-1799925

"Partial Content" denotes transmitting a part of the contents file and is used to distinguish the "RESUME" response message from the "PLAY" response message.

"Content-Length: 1684212" shows that the size of the remaining contents file to be transferred is 1684212 bytes. "Content-Length: 1684212" is calculated based on "X-RPS-Packet-Receive" included the "RESUME" request.

"Content-Range: bytes 115713-1799925" shows that a range of the contents file to be transferred is "from 115713th byte to 1799925th byte".

"TEARDOWN" is a instruction that the client 10 stops the streaming transfer and requests to terminate the TCP session to the server 20.

The client 10 makes and delivers a "TEARDOWN" request message as described in Table 11 to the server 20.

TABLE 11

TEARDOWN rtsp://streaming.june.com/81100/00001.skm RTSP/1.0
Cseq:6
Session: 2890844526

The server 20 makes and delivers a "TEARDOWN" response message as described in Table 12 to the client 10.

TABLE 12

RTSP/1.0 200 OK
CSeq: 6
Session: 2890844526

The RTSP based progressive streaming method will be described hereinafter.

At steps S100 and S101, the client 10 operates the player and connects the TCP session to the server 20. At step S 102, the client 10 transmits "DESCRIBE" request message to the server 20, then, at step S103, the server 20 delivers the "DESCRIBE" response message including the SDP information to the client 10.

At step S 104, the client 10 sets up the initial value of the player, e.g., a decoder based on the SDP information. If the client 10 can not decode the contents file based on the SDP information, the client 10 transmits the "TEARDOWN" request message and performs termination process of the TCP session.

At step S105, the client 10 delivers the "SETUP" request message to the server 20. Particularly, the client 10 makes the "SETUP" request message including the transport protocol information, in this embodiment TCP, and the port number information so as for streaming the content file. At step S 106, the server 20 transmits the "SETUP" response message including the session identification information to the client 10.

Then, at step S 107, the client 10 delivers the "PLAY" request message to the server 20 in order for streaming the contents file. At step S 108, the server 20 delivers the "PLAY" response message to the client 10, at step S 109, the server 20 delivers the TCP packets continuously. At step SIIO, the client 10 buffers the transferred TCP packets for a predetermined time early then plays the TCP packets in real-time.

At step S 111, the client 10 delivers the "PAUSE" request message to the server 20, and at step S112, the server 20 delivers to the client 10 the "PAUSE" response message including the number of the TCP packets already transferred by that time. At step S113, the server 20 stops transmitting the TCP packets and maintains connection of the TCP session.

Then, at step S114, the client 10 delivers to the server 20 the "RESUME" request message including the number of the TCP packets already received, at steps S115, the server 20 delivers "RESUME" response message to the client 10. At step S116, the server 20 restarts streaming the TCP packets based on the number of the TCP packets already received from the next TCP packet to the TCP packets transferred to the client 10 before pausing. At step S117, the client 10 replays the contents file from the next TCP packet to the TCP packets already transferred.

At step S118, the client 10 delivers the "TEARDOWN" request message to the server 20 in order to end the streaming because of user's request or completion of transmitting the contents file. At step S119, the server 20 delivers the "TEARDOWN" response message to the client 10. At step S 120, the server 20 ends the connection of the TCP session to the client 10, and, at step S121, and terminates the streaming of the contents file. At step S122, the client 10 terminates the playing the contents file.

Figure 6:
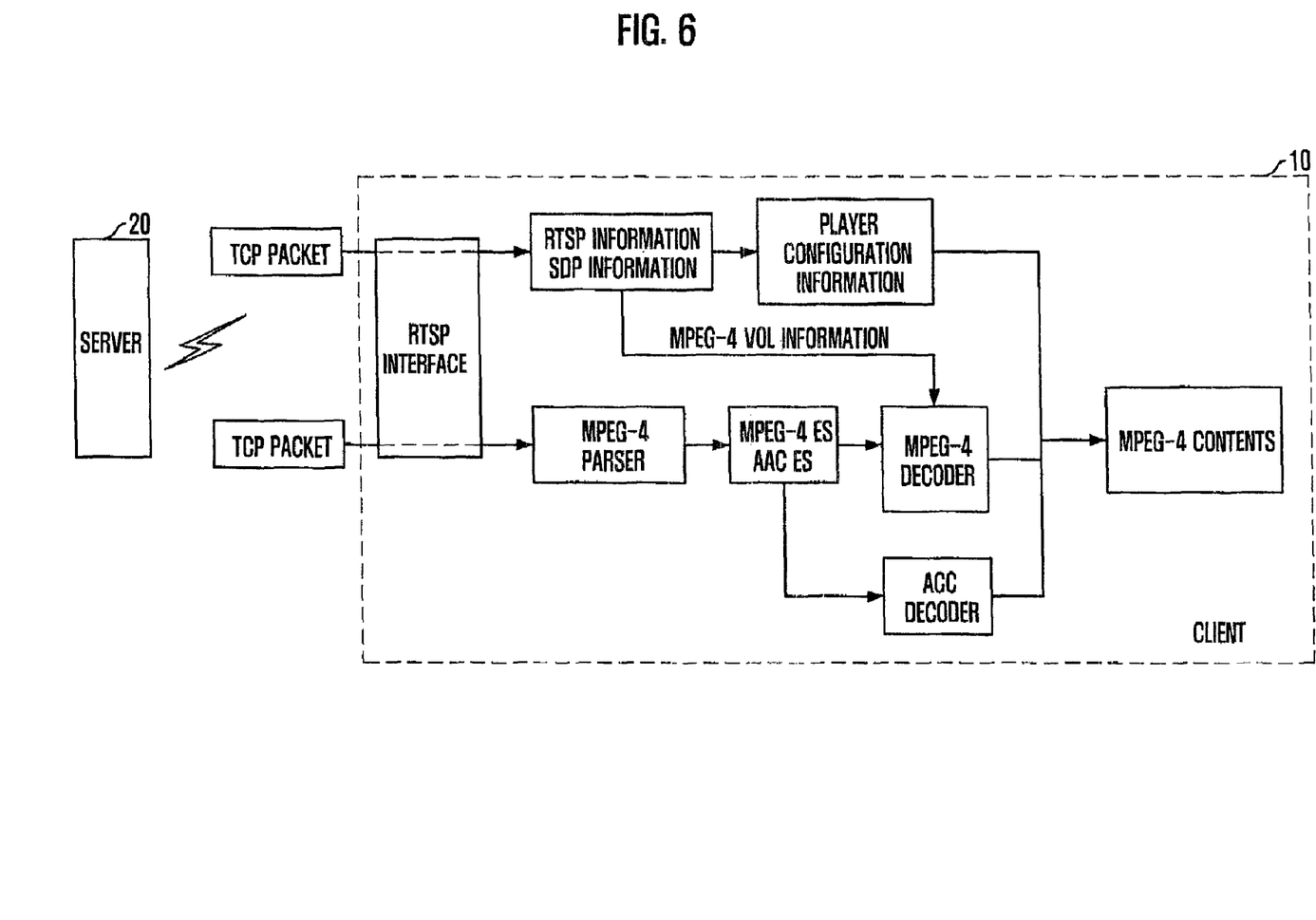
FIG. 6 is a block diagram showing a RTSP based progressive streaming system which is based on MPEG-4.
Figure 7:
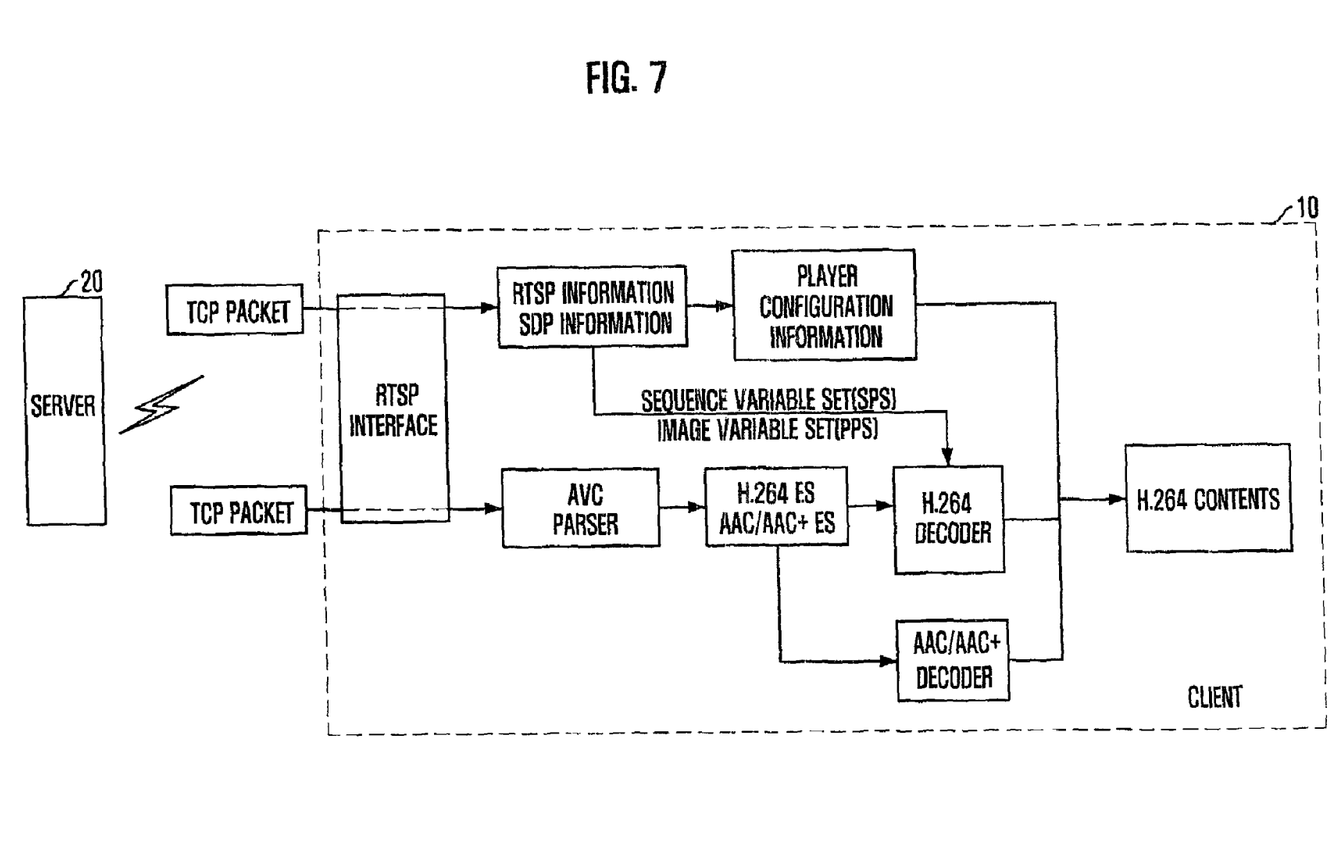
FIG. 7 is a block diagram showing a real-time streaming protocol (RTSP) progressive streaming system which is based on H.264.

FIG. 6 is a block diagram showing a RTSP based progressive streaming system which is based on MPEG-4 (hereinafter, referred to as "MPEG-4 based system"); and FIG. 7 is a block diagram showing a real-time streaming protocol (RTSP) progressive streaming system which is based on H.264 (hereinafter, referred to as "H.264 based system").

As shown, in the MPEG-4 based system and the H.264 based system, the client 10 communicates the control signal or data with the server 20 through the TCP channel.

Particularly, the RTSP is used for control between the client 10 and the server 20. The SDP information is included in the RTSP message body as the identification information of the control signal.

Referring to FIG. 6, in the MPEG-4 based system, the MPEG-4 video object layer (VOL) information is provided to the MPEG-4 decoder through the SDP information presents in advance. That is to say, the MPEG-4 based system receives in advance the configuration information of the player, which is necessary to operate the MPEG-4 decoder, through the SDP information, not through the MPEG-4 video compression streaming data, and sets up variable numbers of the MPEG-4 decoder.

Referring to FIG. 7, in the H.264 based system, the sequence parameter set (SPS) information and the pictures parameter set (PPS) information are provided to the H.264 decoder through the SDP information in advance. That is to say, the H.264 system receives in advance the configuration information of the player, which is necessary to operate the H.264 decoder, by the SDP information, not by a H.264 video streaming, and sets up variable numbers of the H.264 decoder.

The present invention can deliver various requests of the client to the server and provides convenience to the user in the interactive service.

The present invention can be used MPEG-4 based real-time protocol progressive streaming system. Also, the present invention can be used H.264 based real-time protocol progressive streaming system.

The present application contains subject matter related to Korean patent application no. 2006-36883 filed with the Korean Patent Office on Apr. 24, 2004, the entire contents of which being incorporated herein by reference.

The present application contains subject matter related to Korean paten application no. 2006-36883 filed with the Korean Patent Office on Apr. 24, 2004, the entire contents of which being incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A progressive streaming method based on a real-time streaming protocol, wherein a server transfers session description protocol (SDP) information and performs streaming of a contents file to a client, the method comprising steps of:
   a) if a "setup" request message including a transport protocol for streaming the contents file and an identifier for a client port allocated for streaming the contents file is received from the client, initiating a session for streaming of the contents file, and transmitting a "setup" response message to the client;
   b) if a "play" request message is received from the client, transmitting a "play" response message to the client, and starting streaming transmission of TCP packets of the contents file to the client;
   c) if a "pause" request message is received from the client, transmitting a "pause" response message including a number of transmission control protocol (TCP) packets transferred to the client since the starting streaming transmission of TCP packets of the contents file, and pausing streaming of the contents file;
   d) if a "replay" request message including a number of a TCP packet to be transferred is received from the client, transmitting a "replay" response message and restarting transmission of TCP packets from a next TCP packet to a TCP packet transferred to the client before the contents file was paused; and
   e) before the step a), if a "describe" request message, including an indication of a position in the contents file from which to start streaming, is received from the client, transmitting a "describe" response message indicating a replay position in the contents file.

2. The method as recited in claim 1, wherein the SDP information includes video object layer (VOL) information of a Moving Picture Experts Group-4 (MPEG-4) standard of coding.

3. The method as recited in claim 1, wherein the SDP information includes H.264 sequence variable set (SPS) information and pictures parameter set (PPS) information.

4. The method as recited in claim 1, further comprising:
   f) before the step c), providing configuration information by transferring the SDP information to the client in order to operate a player in advance.

5. The method as recited in claim 4, further comprising:
   providing session identification information to the client after the step f).

6. The method as recited in claim 1, wherein the "replay" response message includes a field which denotes a part of the contents file to be transferred from the next TCP packet to the TCP packet transferred to the client before the contents file was paused.

7. The method as recited in claim 1, wherein the "replay" response message includes a field which denotes a size of remaining TCP packets of the contents file to be transferred.

8. The method as recited in claim 1, wherein the "replay" response message includes a field which denotes a range of remaining TCP packets of the contents file to be transferred.

9. The method as recited in claim 1, wherein the transport protocol included in the "setup" request message received from the client is the transmission control protocol (TCP).

10. The method as recited in claim 1,
    wherein the "describe" request message comprises an indication of a description protocol supported by the client, and wherein the "describe" response message indicates the session description protocol (SDP) information.

11. The method of claim 10, wherein the "describe" request message comprises "Accept: application/sdp" and "X-RPS-Start-Request: 0-", and wherein the "describe" response message comprises "X-RPS-Start-Response: 0-".

12. A server for streaming a contents file to a client in accordance with a real-time streaming protocol (RTSP) based progressive streaming method, the server comprising:
    a processing device configured to:
    a) if a "setup" request message including a transport protocol for streaming the contents file and an identifier for a client port allocated for streaming the contents file is received from the client, initiate a session for streaming of the contents file, and transmit a "setup" response message to the client;
    b) if a "play" request message is received from the client, transmit a "play" response message to the client, and start streaming transmission of transmission control protocol (TCP) packets of the contents file to the client;
    c) if a "pause" request message is received from the client, transmit a "pause" response message including a number of TCP packets transferred to the client since the starting streaming transmission of TCP packets of the contents file, and pause streaming of the contents file;
    d) if a "replay" request message including a number of a TCP packet to be transferred is received from the client, transmit a "replay" response message and restart transmission of TCP packets from a next TCP packet to a TCP packet transferred to the client before the contents file was paused; and e) before the step a), if a "describe" request message, including an indication of a position in the contents file from which to start streaming, is received from the client, transmit a "describe" response message indicating a replay position in the contents file.

13. The server of claim 12, wherein the "describe" response message indicates session description protocol (SDP) information.

14. The server of claim 13, wherein the SDP information includes video object layer (VOL) information of a Moving Picture Experts Group-4 (MPEG-4) standard of coding.

15. The server of claim 13, wherein the SDP information includes H.264 sequence variable set (SPS) information and pictures parameter set (PPS) information.

16. The server of claim 12, wherein the "describe" request message comprises an indication of a description protocol supported by the client.

17. The server of claim 12, wherein the "replay" response message includes a field which denotes a size of remaining TCP packets of the contents file to be transferred.

18. The server of claim 12, wherein the "replay" response message includes a field which denotes a range of remaining TCP packets of the contents file to be transferred.

19. A computer program product for streaming a contents file from a computer to a client in accordance with a real-time streaming protocol (RTSP) based progressive streaming method, the computer program product comprising a non-transitory computer readable medium, wherein the medium comprises one or more computer-executable program code portions that, when executed by the computer, cause the computer to:

a) if a "setup" request message is received from the client, initiate a session for streaming the contents file, and transmit a "setup" response message to the client;

b) if a "play" request message is received from the client, transmit a "play" response message to the client, and start streaming transmission of transmission control protocol (TCP) packets of the contents file to the client;

c) if a "pause" request message is received from the client, transmit a "pause" response message including a number of TCP packets transferred to the client since the starting streaming transmission of TCP packets of the contents file, and pause streaming of the contents file;

d) if a "replay" request message including a number of a TCP packet to be transferred is received from the client, transmit a "replay" response message and restart transmission of TCP packets from a next TCP packet to a TCP packet transferred to the client before the contents file was paused; and e) before the step a), if a "describe" request message, including an indication of a position in the contents file from which to start streaming, is received from the client, transmit a "describe" response message indicating a replay position in the contents file.

20. The computer program product of claim 19, wherein the "describe" request message comprises an indication of a description protocol supported by the client, wherein the "describe" response message indicates session description protocol (SDP) information, and wherein the "setup" request message comprises a transport protocol for streaming the contents file and an identifier for a client port allocated for streaming the contents file.

* * * * *